(12) United States Patent
Gentry et al.

(10) Patent No.: US 7,721,089 B2
(45) Date of Patent: May 18, 2010

(54) BROADCAST ENCRYPTION USING RSA

(75) Inventors: Craig B. Gentry, Mountain View, CA (US); Zulfikar Amin Ramzan, San Mateo, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1105 days.

(21) Appl. No.: 10/544,060

(22) PCT Filed: May 21, 2004

(86) PCT No.: PCT/US2004/015946

§ 371 (c)(1),
(2), (4) Date: Jul. 29, 2005

(87) PCT Pub. No.: WO2004/107635

PCT Pub. Date: Dec. 9, 2004

(65) Prior Publication Data

US 2007/0016769 A1    Jan. 18, 2007

Related U.S. Application Data

(60) Provisional application No. 60/472,591, filed on May 21, 2003, provisional application No. 60/482,501, filed on Jun. 25, 2003.

(51) Int. Cl.
*H04L 29/00* (2006.01)
(52) U.S. Cl. .................. 713/163; 713/158; 713/168; 726/17; 726/28; 380/277; 380/278; 380/279
(58) Field of Classification Search .................. 713/158, 713/163, 168; 380/277–279; 726/17, 28
See application file for complete search history.

(56) References Cited

U.S. PATENT DOCUMENTS

| 7,039,803 | B2 * | 5/2006 | Lotspiech et al. ........... 713/163 |
| 2002/0147906 | A1 | 10/2002 | Lotspiech et al. |
| 2003/0161474 | A1 | 8/2003 | Matsuzaki et al. |

OTHER PUBLICATIONS

M. Abdalla, Y. Shavitt, and A. Wool. "Key Management for Restricted Multicast Using Broadcast Encryption" ACM Trans. On Networking, vol. 8, No. 4, pp. 443-454, 2000.

S. G. Akl, and P.D. Taylor. "Cryptographic Solution to a Multilevel Security Problem" Proceedings of Crypto 1982, pp. 237-250. Plenum Press, 1982.

(Continued)

*Primary Examiner*—Carl Colin
(74) *Attorney, Agent, or Firm*—Haynes and Boone, LLP (57) ABSTRACT

Methods, components and systems for implementing secure and efficient broadcast encryption schemes with configurable and practical tradeoffs among a pre-broadcast transmission bandwidth t, a key storage cost k, and a key derivation cost c, in which the schemes use subtree difference and key decomposition to generate secondary keys, use the secondary keys to encrypt the broadcast and generate ciphertexts, and use the RSA encryption scheme to implement derivability between the primary keys and the secondary keys. To decrypt the broadcast, a privileged user uses one of its primary keys to derive a secondary key, which is used to decrypt the broadcast. The product of key derivation cost c and the key storage cost k is at most $(2a-\log a-2)\log_a n$, when n is the number of users, $1 \leq b \leq \log n$, $a=2^b$, and revoked users $r<n/3$.

51 Claims, 8 Drawing Sheets

OTHER PUBLICATIONS

S.G. Akl and P.D. Taylor. "Cryptographic Solution to a Problem of Access Control in a Hierarchy" ACM Trans. On Comp. Sys., vol. 1, No. 3, pp. 239-248, 1983.

A. Anagnostopoulos, M.T. Goodrich, and R. Tamassia. "Persistent Authenticated Dictionaries and Their Applications" Proc. Info. Sec. Conf. 2001, LNCS 2200, pp. 379-393, Springer Verlag, 2001.

J. Anzai, N. Matsuzaki and T. Matsumoto "A Quick Group Key Distribution Scheme with Entity Revocation" Proc. Of Asiacrypt 1999, LNCS 1716, pp. 333-347, Springer Verlag, 1999.

T. Asano "A Revocation Scheme with Minimal Storage at Receivers" Proc. Of Asiacrypt 2002, LNCS 2501, pp. 433-450, Springer Verlag, 2002.

M. Abdalla, Y. Shavit, and A. Wool "Key Management for Restricted Multicast Using Broadcast Encryption" IEEE/ACM Transactions on Networking 8(4), pp. 443-454, Aug. 2000.

J. Benaloh and M. de Mare "One-Way Accumulators: A Decentralized Alternative to Digital Signatures" Proceedings of Eurocrypt 1993, LNCS 765, pp. 274-285, Springer Verlag, 1994.

S. Berkovits "How to Broadcast a Secret" Proc. Of Eurocrypt 1991, LNCS 547, pp. 535-541, Springer Verlag, 1991.

D. Boneh and M. Franklin "An Efficient Public Key Traitor Tracing Scheme" Proc. Of Cypto 1999, LNCS 1666, pp. 338-353, Springer Verlag, 1999.

J. Camenisch and A. Lysyanskaya "Dynamic Accumulators and Application to Efficient Revocation of Anonymous Credentials" Proc. Of Crypto 2002, LNCS 2442, pp. 61-??, Springer-Verlag, 2002.

R. Canetti, T. Malkin and K. Nissim "Efficient Communication-Storage Tradeoffs for Multicast Encryption" Proc. Of Eurocrypt 1999, pp. 459-474, Springer-Verlag, 1999.

G. C. Chick and S.E. Tavares "Flexible Access Control with Master Keys" Proc. Of Crypto 1989, LNCS 435, pp. 316-322, Springer-Verlag, 1990.

B. Chor, A. Fiat, M. Naor "Tracing Traitors" Proc. Of Crypto 1994, LNCS 839, pp. 257-270, Springer Verlag, 1994.

W. Diffie and M. Hellman "New Directions in Cryptography" IEEE Transactions on Information Theory, IT-22 (6), 1976.

A. Fiat and M. Naor "Broadcast Encryption" Proc. Of Crypto 1993, LNCS 773, pp. 480-491, Springer-Verlag, 2002.

M.T. Goodrich, R. Tamassia, and J. Hasic "An Efficient Dynamic and Distributed Cryptographic Accumulator" Proc. Info. Sec. Conf. 2002, LNCS 2433, pp. 372-288, Springer Verlag, 2002.

D. Halevy and A. Shamir "The LSD Broadcast Encryption Scheme" Proc. Of Crypto 2002, LNCS 2442, pp. 47-60, Springer-Verlag, 2002.

Y. Kim, A. Perrig, and G. Tsudik "Simple and Fault-Tolerant Key Agreement for Dynamic Collaborative Groups" Proc. Of the ACM Conf. on Comp. and Comm. Sec., CCS 2000.

R. Kumar, S. Rajagopalan, and A. Sahai, "Coding Constructions for Blacklisting Problems" Proc. Of Crypto 1999, LNCS 1666, pp. 609-623, Springer-Verlag, 1999.

M. Luby, and J. Staddon "Combinational Bounds for Broadcast Encryption" Proc. Of Eurocrypt 1998 LNCS 1403, pp. 512-526, Springer-Verlag, 1998.

N. Matsuzaki, J. Anzai, and T. Matsumoto "Light Weight Broadcast Exclusion Using Secret Sharing" Proc. Of ACISP 2000, LNCS 1841, pp. 313-327, Springer-Verlag, 2000.

S. Mitra "Iolus: A Framework for Scalable Secure Multicasting" Proc. Of ACM SIGCOMM, Sep. 1997.

S.J. MacKinnon, P.D. Taylor H. Meijer, and S.G. Akl "An Optimal Algorithm for Assigning Cryptographic Keys to Access Control in a Hierarchy" IEEE Trans. On Comp., vol. C34, No. 9, pp. 797-802, 1985.

D.A. McGrew and A.T. Sherman "Key Establishment in Large Dynamic Groups Using One-Way Function Trees" Defense Advanced Research Projects Agency, under contract F30602-97-C-0277, May 20, 1998, pp. 1-13.

D. Naor, M. Naor and J. Lotspiech "Revocation and Tracing Schemes for Stateless Receivers" Proceedings of Crypto 2001, LNCS 2139, pp. 41-62, Springer-Verlag, 2001.

M. Naor and B. Pinkas. "Efficient Trace and Revoke Schemes" Proc. Of Financial Cryptography 2000, LNCS, 1962, pp. 1-20, Springer-Verlag, 2000.

M. Naor and O. Reingold "Number-Theoretic Constructions of Efficient Pseudorandom Functions" Proc. Of FOCS 1997, pp. 458-467, 1997.

R. Poovendran and J.S. Baras "An Information Theoretic Analysis of Rooted-Tree Based Secure Multicast Key Distribution Schemes" Proc. Of Crypto 1999, LNCS 1666, pp. 624-638, Springer-Verlag, 1999.

I. Ray, I. Ray, and N. Narasimhamurthi "A Cryptographic Solution to Implement Access Control in a Hierarchy and More," SACMAT '02, Jun. 3-4, 2002, pp. 1-13.

R.L. Rivest, A. Shamiar, and L. Adleman "A Method for Obtaining Digital Signatures and Public-Key Cryptosystems" Comm. Of the ACM, 21, pp. 120-126, 1978.

A. Shamir "How to Share a Secret" Comm. Of the ACM, 22, pp. 612-613, 1979.

C.K. Wong, M. Gouda, and S.S. Lam "Secure Group Communications Using Key Graphs" Proc. Of SIGCOMM 1998, 1998.

Kogan, N.; Shavitt, Y.; Wool, A.; "A Practical Revocation Scheme for Broadcast Encryption Using Smart Cards", Security and Privacy, 2003. Proceedings. 2003 IEEE Symposium on May 11-14, 2003; pp. 225-235.

D. M. Wallner, E. J. Harder, and R.C. Agee "Key Management for Multicast: Issues and Architectures" Internet Draft, Sep. 1998.

* cited by examiner

BROADCAST ENCRYPTION USING RSA

CROSS-REFERENCE TO RELATED APPLICATIONS

This application claims the benefit of Provisional Application No. 60/472,591, filed May 21, 2003, and Provisional Application No. 60/482,501, filed Jun. 25, 2003. This application incorporates these provisional applications by reference.

BACKGROUND OF THE INVENTION

1. Field of the Invention

The present invention relates to broadcast encryption, and more specifically to implementing efficient broadcast encryption schemes with configurable tradeoffs among pre-broadcast transmission bandwidth, key storage cost, and key derivation cost.

2. Description of the Related Art

Broadcast encryption schemes allow a center to transmit encrypted data over a broadcast channel to a large number of users such that only privileged users, a select subset P of the users, can decrypt it. Traditional applications include Pay TV, content protection on CD/DVD/flash memory, secure Internet multicast of privileged content such as video, music, stock quotes, news stories, and the like. However, broadcast encryption schemes can be used in any setting that might require selective disclosure of potentially lucrative content.

Broadcast encryption schemes typically involve a series of pre-broadcast transmissions, at the end of which the users in P can decrypt a broadcast session key bk. The remainder of the broadcast is then encrypted using bk.

In terms of efficiency, the most important parameters of the broadcast encryption schemes are: 1) the number of pre-broadcast transmissions t made by the center; 2) the maximum amount of keying material k a user must persistently store; and 3) the maximum amount of computation c the user must perform to decrypt the broadcast session key bk from the pre-broadcast transmissions. In a system of n users, r of which are to be revoked, a broadcast encryption scheme must find a favorable balance among the parameters t, k, and c.

One variant of the broadcast encryption problem, for which finding an efficient solution has been difficult, is the so-called "stateless receiver" case. This variation includes the following requirements:

1. Each user in the privileged set P can decrypt the broadcast by himself.
2. No coalition of users outside the privileged set P can decrypt the broadcast.
3. Consecutive broadcasts may address unrelated privileged sets.
4. A user need not update its keys if other users leave or join the privileged set.
5. A user's keys are unaffected by its viewing history.

In this case, users are provided with some initial key or set of keys, and can only use this keying material when decrypting future broadcasts. Stateless receivers can store only the keys given at the initial stage such as manufacturing time. As a result, every broadcast message must contain enough information to enable non-revoked receivers to obtain the current session key using their initial receiver keys. The above definition can also be extended to allow some threshold of free riders, i.e. users outside of the privileged sets who might be able to decrypt the broadcast.

The stateless model is preferable since it does not involve any type of key update procedure, which is not only costly but also introduces additional points of failure. Since keys are not updated in the stateless model, they can be embedded in non-volatile tamper-resistant storage. This enhanced security reduces the possibility of piracy in broadcast settings.

The problem of stateless receiver broadcast encryption, a practical trade-off among pre-broadcast transmissions t, user key storage k, and user decryption computation c, is well-known in the literature. However, previously proposed solutions are all inefficient with respect to at least one of the parameters. Essentially, these proposals belong to one of three categories: 1) schemes using error-correcting codes, 2) schemes using key trees, and 3) schemes using RSA.

The schemes using error-correcting codes require the number of revoked user r be specified in advance, and one or more of the parameters t, k and c be at least linear with r. However, the number of revoked users r changes from time to time in practice. The key-tree-based stateless receiver broadcast encryption scheme needs to store log n (or more) keys in limited devices, such as tamper-resistant smart cards. The user key storage k is very high.

The RSA public-key encryption scheme was proposed in R. L. Rivest, A. Shamir and L. Adleman (RSA), *A Method for Obtaining Digital Signatures and Public—Key Cryptosystems*—Comm. Of the ACM (1978), vol. 21, 120-126. According to the RSA scheme, a keyholder chooses two large prime numbers p and q, and two exponents e and d such that ed≡1 (mod $\Phi(n)$), where $\Phi(n)$=LCM(p−1)(q−1). The scheme publishes e and the product n=pq, but keeps d, p and q secret. To encrypt a message m∈ Z/nZ, a sender computes $m^e$ (mod n) and transmits this number to the keyholder. To decrypt, the keyholder computes m≡$(m^e)^d$(mod n). Over the past 27 years, numerous cryptographic inventions have used ideas related to RSA that were not envisioned by the inventors of RSA. The RSA encryption scheme does not, in itself, address the problem of broadcast encryption.

In S. G. Akl and P. D. Taylor, *Cryptographic Solution to a Multilevel Security Problem—Crypto '82*, Plenum Press (1982), 433-450, Akl and Taylor used techniques related to RSA to handle access control. In Akl-Taylor, each user is a member of one or more security classes. For any fixed set of security classes, each user in their scheme obtains a single "master key" that enables it to gain access to any security class of which it is a member. These security classes form a partially-ordered set (poset) under the inclusion relation. This poset can be modeled as a directed acyclic graph (DAG). Akl-Taylor uses RSA to generate a set of immiscible keys tailored for a given DAG. Nonmembers of a security class cannot collude to gain access to the security class. The center generates an RSA modulus n=pq and fixes some m∈(Z/nZ)*. Keys have the form $k_i = m^{1/e_i}$(modn) for publicly known $e_i$. An important property of RSA is that, given e, it is computationally easy to compute $m^e$ (mod n) for any m, but it is computationally hard to compute $m^{1/e}$ (mod n), i.e., it is easy to compute eth powers but hard to compute eth roots. Thus, $k_i \rightarrow k_j$ if $e_j$ divides $e_i$. In other words, if $e_j$ divides $e_i$, keys $k_j$ can be computed from keys $k_i$. More generally, $$\{k_{i_1}, \ldots k_{i_z}\} \rightarrow k_j, \text{ if and only if } e_j \text{ divides} \\ \text{LCM}(e_{i_1}, \ldots e_{i_z}) \quad (1)$$

Thus, key derivability is completely dictated by the factorization of the $e_i$'s. In Akl-Taylor, each vertex $v_i$ in the DAG is associated with a distinct prime $p_i$, and $e_i = \Pi_{v_i \rightarrow v_j} P_j$. The keys are immiscible, and nonmembers of a security class cannot collude to gain access. However, the cost of computing $k_j$ from $k_i$ in Akl-Taylor is very high. In addition, the Akl-Taylor scheme does not address the problem of broadcast encryption, where the privileged subsets may change from one broadcast to another.

In T. Asano, *A Revocation Scheme with Minimal Storage at Receivers—Asiacrypt '02*, Lecture Notes in Computer Science 2501 (2002), Springer-Verlag, 433-450, Asano proposes a stateless receiver broadcast encryption scheme in which each user only needs to store a single key. According to the Asano scheme, users are positioned as leaves in a hierarchical tree such that each node in the tree (other than the root) has a-1 siblings, wherein a denotes the branching factor. Each user is allowed to derive $(2^{a-1}-1)\log_a n+1$ subset keys, where each subset contains an ancestor of the user's leaf, together with some number (but not all) of the ancestor's siblings. These subsets form a poset under the inclusion relation, and key derivability can be modeled by a DAG. A privileged user can use its key to derive secondary keys, one of which is used to recover the broadcast session key bk and then the broadcast. The Asano scheme uses techniques related to the RSA encryption scheme to dictate which keys can be derived from other keys. However, the derivability graph that the Asano scheme uses is highly non-optimal. Fixing the number of transmissions to be $t=O(r \log_a(n/r))$, the user's computational requirement becomes $c=O(2^a \log_a n)$, which quickly becomes huge as a increases. Thus, although the Asano scheme has the advantage of requiring a user to store only one key, and of being able to trade off the number of pre-broadcast transmission for user decryption computation, the computation increases at an unacceptable rate as the transmission decreases.

In M. Luby and J. Staddon, *Combinatorial Bounds for Broadcast Encryption—Eurocrypt '98*, Lecture Notes in Computer Science 1403 (1998), Springer-Verlag, 512-526, Luby and Staddon considered a variant of unconditionally secure one-time broadcast encryption schemes (OTBESs). In this model, each user u is given some set $K'_u$ of keys. The Luby-Staddon scheme proves a combinatorial bound relating $\max_u |K'_u|$ and the number of pre-broadcast transmissions t—namely, $$\max_u |K'_u| \geq \left(\frac{\binom{n}{r}^{1/t}}{t} - 1\right) / r \tag{2}$$

where n is the total number of users, and r is the number of users that are not entitled to the broadcast. However, there is no derivability among the keys, and keys are used only once (as a one-time pad).

Accordingly, there has been a need for a broadcast encryption scheme with an acceptable and configurable tradeoff among t, k and c.

SUMMARY OF THE INVENTION

In view of the foregoing, it is one object of the present invention to provide methods, components and systems for implementing secure and efficient broadcast encryption schemes with configurable and practical tradeoffs among the pre-broadcast transmission bandwidth t, the key storage cost k, and the key derivation cost c. The schemes use a method loosely related to the RSA encryption scheme to enforce relationships between pairs of keys—i.e., whether one key can be derived from the other. To decrypt the broadcast, a privileged user uses one of its primary keys to derive a secondary key, which is used to decrypt the broadcast. Potentially, many secondary keys may be derivable from a single primary key. Only the primary keys need to be stored on the user's device.

According to one aspect of the present invention, specific combinatorial constructions are provided which allocate primary and secondary keys to the users in a way that enables the broadcast source to efficiently include a random privileged subset while excluding the corresponding revoked subset. For example, one of these constructions requires each user to store only a single primary key, has pre-broadcast transmission bandwidth $t=O(r \log_a(n/r))$, and requires $(2a-\log(a)-2) \log_a(n)$ computational units for key derivation, where a is a parameter that can be adjusted. For the same k and t, $c=(2^a-1)\log_a(n)$ in Asano's construction. The present invention thus represents an exponential improvement over the Asano scheme.

According to another aspect of the invention, a general method is provided for taking any mapping between keys and user subsets that is preferably combinatorially optimized for broadcast encryption, and converting it into an RSA-based scheme, with the same optimized mapping between secondary keys and user subsets, that has a configurable tradeoff between key storage cost of primary keys k and key derivation cost c. The present invention allows direct application of combinatorial results relating to unconditionally secure broadcast encryption to the problem of broadcast encryption that uses RSA-type techniques for key derivation. The method works essentially as follows.

1. The key manager chooses an appropriate modulus n, and choose a random number m modulo n—i.e., m∈ Z/nZ.
2. Find an allocation of keys to users that is preferably combinatorially optimized for, e.g., unconditionally secure, broadcast encryption.
3. For each user u, identify the set of secondary keys $K'_u$ known to that user.
4. Associate each key $k_i$ with a distinct prime $p_i$ and redefine $k_i$ to be $M^{1/p_i}$ (mod n).
5. To allow each user to store only one key, user u is given the number $m^{1/e_u}$ (mod n), where $e_u = \Pi_{k_j \in K'_u} p_j$.
6. If $k_i \in K'_u$, user u can derive $m^{1/p_i} = (m^{1/e_u})^{e_u/p_i}$ (mod n).

Thus, the present invention, in which a user only stores one key, can easily be adapted to enable a configurable tradeoff between key storage cost and key derivation cost. Also, other variations are possible that improve efficiency under some circumstances.

It is a further object of the present invention to provide a general method for converting any broadcast encryption scheme that is preferably combinatorially optimized with respect to t and k into a new broadcast encryption scheme using RSA-related techniques that is combinatorially optimized with respect to t, k and c and that has a configurable tradeoff between k and c.

BRIEF DESCRIPTION OF THE DRAWINGS

The present invention is described herein with reference to the accompanying drawings, similar reference numbers being used to indicate functionally similar elements.

DETAILED DESCRIPTION OF THE EMBODIMENTS

The present invention provides methods, components and systems for implementing secure and efficient broadcast encryption schemes with configurable and practical tradeoffs among the pre-broadcast transmission bandwidth t, the key storage cost k, and the key derivation cost c. Each user u in a set of users U stores some set of primary keys $K_u$. The user's key storage cost is defined to be the number of keys that the user stores—i.e., $|K_u|$. From the primary keys in $K_u$, a user u can derive a set of secondary keys $K'_u$. The set of secondary keys $K'_u$ is preferably larger than the set of primary keys $K_u$. $K'_u$ is a subset of K, the set of all secondary keys. To encrypt a broadcast such that only a privileged set P of users can decrypt it, the broadcast source finds a set of secondary keys $K_p \in K$ such that each member of P can derive at least one key in $K_p$, but no revoked member in U-P can. The source chooses a broadcast session key bk, encrypts bk under each of the keys in $K_p$, and then encrypts the broadcast using bk. The source transmits the $|K_p|$ encryptions of bk, the encrypted broadcast, and information allowing a member of P to determine which encryption of bk it can decrypt. The number of transmissions t is defined to be $|K_p|$. If a user is in P, it can decrypt by using its stored set of primary keys $K_u$ to derive the appropriate secondary key in $K'_u \cap K_p$, decrypt bk and then decrypt the broadcast. Deriving a secondary key from a primary key requires some number of computational units c. The nature and number of these units depend on how key derivability is handled mathematically. In the present invention, key derivability is handled using techniques related to the RSA encryption scheme.

In one embodiment, the method of the present invention is implemented as follows. First, secondary keys are allocated to users in a way that achieves a nearly optimal combinatorial tradeoff between the maximum number of pre-broadcast transmissions required from the broadcast source and the maximum number of secondary keys that a user needs to know. This first part does not consider derivability among keys. Second, given an allocation of secondary keys to users, primary keys are constructed in accordance with the desired tradeoff between key storage cost and key derivation cost.

The first part is a purely combinatorial problem. Under the reasonable assumption that a user must be able to derive one of the secondary keys in order to decrypt the broadcast, the relationship between the maximum number of secondary keys per user and the number of required pre-broadcast transmissions according to one embodiment of the present invention is as follows:

$$\max_u |K'_u| \approx (2a - \log a - 2) \log_a n, \text{ and} \quad (3)$$

$$t \approx r \log_a(n/r), \quad (4)$$

where a is a parameter that can be adjusted and logarithms are taken in base 2 unless otherwise specified. This construction is preferred for two reasons. First, the number of keys does not depend on r, the number of revoked users. This lack of dependency is desirable because the number of revoked users may vary considerably from broadcast to broadcast. Second, this construction is fairly tight with respect to the Luby-Staddon inequality (2) for any fixed a and taking the maximum value of the right side of the inequality over all r.

Figure 1:
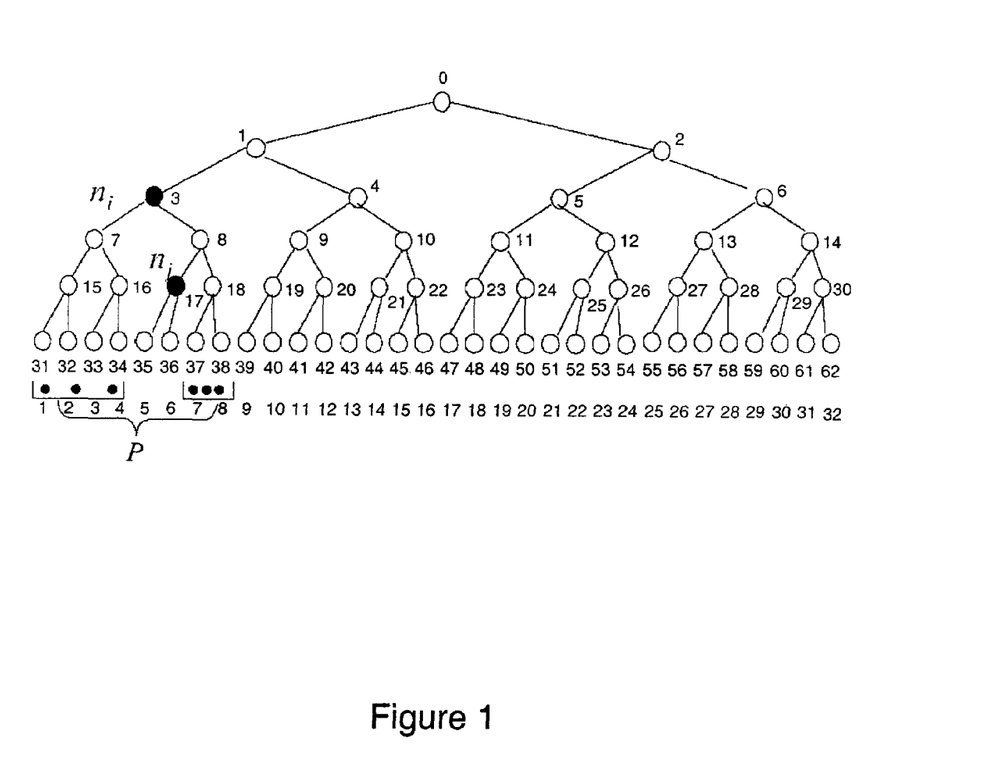
FIG. 1 shows a graphical depiction of the tree construction for n=32 and b=2 according to one embodiment of the present invention.

FIG. 1 shows a graphical depiction of a tree construction for n=32 according to one embodiment of the present invention. The set of users corresponding to the leaves defined by U will be given key $K_{n_i,n_j}$.

As shown, a binary tree of depth $\lceil \log n \rceil$ is constructed and each user u is associated with a leaf of this tree. Let $n_i$ and $n_j$ be nodes in this tree (interior or leaf), wherein $n_i$ is defined to be an ancestor of node $n_j$, if $n_i \neq n_j$ and $n_i$ is on the path from $n_j$ to the root of the tree. Define $l(n_i)$ and $l(n_j)$ to be the depth in the tree of these nodes from the root in terms of levels. An integer b is chosen such that $1 \leq b \leq \log_2 n$, and an integer a is set to $2^b$. In the embodiment shown in FIG. 1, b=2 and a=4. The variable a does not necessarily need to be an exact power of 2. When variable a is not an exact power of 2, the b-level subtrees with a leaves will not be full. A key $K_{n_i,n_j}$ is generated for all node pairs $(n_i, n_j)$ such that $n_i$ is an ancestor of $n_j$ and $\lfloor l(n_i)/b \rfloor = \lfloor (l(n_j)-1)/b \rfloor$, and K is the set of all such keys.

In FIG. 1, such node pairs include:

$(n_0, n_1), (n_0, n_2)$, when $l(n_i)=0$, and $l(n_j)=1$ $(n_1, n_3), (n_1, n_4), (n_2, n_5), (n_2, n_6)$, when $l(n_i)=1$, and $l(n_j)=2$;

$(n_3, n_7), (n_3, n_8), (n_4, n_9), (n_4, n_{10}), (n_5, n_{11}), (n_5, n_{12}), (n_6, n_{13}), (n_6, n_{14})$, when $l(n_i)=2$, and $l(n_j)=3$;

$(n_3, n_{15}), (n_3, n_{16}), (n_3, n_{17}), (n_3, n_{18}), (n_4, n_{19}), (n_4, n_{20}), (n_4, n_{21}), (n_4, n_{22}), (n_5, n_{23}), (n_5, n_{24}), (n_5, n_{25}), (n_5, n_{26}), (n_6, n_{27}), (n_6, n_{28}), (n_6, n_{29}), (n_6, n_{30})$, when $l(n_i)=2$, and $l(n_j)=4$;

$(n_7, n_{15}), (n_7, n_{16}), (n_8, n_{17}), (n_8, n_{18}), (n_9, n_{19}), (n_9, n_{20}), (n_{10}, n_{21}), (n_{10}, n_{22}), (n_{11}, n_{23}), (n_{11}, n_{24}), (n_{12}, n_{25}), (n_{12}, n_{26}), (n_{13}, n_{27}), (n_{13}, n_{28}), (n_{14}, n_{29}), (n_{14}, n_{30})$, when $l(n_i)=3$, and $l(n_j)=4$; and $(n_{15}, n_{31}), (n_{15}, n_{32}), (n_{16}, n_{33}), (n_{16}, n_{34}), (n_{17}, n_{35}), (n_{17}, n_{36}), (n_{15}, n_{37}), (n_{18}, n_{38}), (n_{19}, n_{39}), (n_{19}, n_{40}), (n_{20}, n_{41}), (n_{20}, n_{42}), (n_{21}, n_{43}), (n_{21}, n_{44}), (n_{22}, n_{45}), (n_{22}, n_{46}), (n_{23}, n_{47}), (n_{23}, n_{48}), (n_{24}, n_{49}), (n_{24}, n_{50}), (n_{25}, n_{51}), (n_{25}, n_{52}), (n_{26}, n_{53}), (n_{26}, n_{54}), (n_{27}, n_{55}), (n_{27}, n_{56}), (n_{28}, n_{57}), (n_{28}, n_{58}), (n_{29}, n_{59}), (n_{29}, n_{60}), (n_{30}, n_{61}), (n_{30}, n_{62})$, when $l(n_i)=4$, and $l(n_j)=5$.

A user u associated with leaf node $n_u$ is given the keys $K_{n_i,n_j}$ in K for which $n_i$ is an ancestor of $n_u$, but $n_j$ is not an ancestor of $n_u$. In other words, a user u is given the keys $K_{n_i,n_j}$ for which its leaf $n_u$ is in the subtree rooted at $n_i$ minus the subtree rooted at $n_j$. In total, each user receives at most $(2a-b-2)=(2a-\log a-2) \log_a n$ keys. For example, the user $u_i$ shown in FIG. 1, corresponding to node $n_{31}$, could be given keys:

$k_{n_0,n_2}, k_{n_0,n_4}, k_{n_0,n_5}, k_{n_0,n_6}, k_{n_1,n_4}, k_{n_3,n_8}, k_{n_3,n_{16}}, k_{n_3,n_{17}}, k_{n_3,n_{18}}, k_{n_7,n_{16}}, k_{n_{15},n_{32}}$.

To restrict its encrypted broadcast to a set of privileged users P, the broadcast source must find a set of keys $K_p \in K$, preferably of minimal size, such that each user in P knows at least one key in $K_p$, but no revoked user does. In one embodiment, computing $K_p$ consists of two steps. In the first step, the broadcast source generates a node-pair set $\{(n_i, n_j): n_i$ is an ancestor of $n_j\}$—again, preferably of minimal size—such that each privileged user u (but no revoked user) has a node-pair in the set, wherein $n_i$ is an ancestor of $n_u$, but $n_j$ is not an ancestor of $n_u$. In the second step, each node pair is decomposed into a node-pair key-set $k_{n_i,N_1}, k_{N_1,N_2}, \ldots, k_{N_z,n_j} \in K$, where $n_i$ is an ancestor of $N_1$ such that $\lfloor l(n_i)/b \rfloor = \lfloor (l(N_1)-1)/b \rfloor$, and so on. If $n_i$ is an ancestor of $n_j$ while $n_j$ is not, then the user u will know exactly one of these keys. The broadcast source sets $K_p$ to be the union of the node-pair key-sets over all node pairs in the node-pair set.

Specifically, let $T=ST(R)$ be the Steiner tree formed by the root of the tree and the leaves $\{n_{R_1}, \ldots, n_{R_r}\}$ of the revoked users R. A Steiner tree is a graph with the fewest edges that connects all of the specified nodes to each other. The Steiner tree for the root node of a binary tree and all of the leaf nodes is the entire binary tree itself. In FIG. 1, the revoked nodes are $n_{35}$, $n_{36}$, and $n_{39}$ to $n_{62}$. The Steiner tree includes all of the edges in the binary tree except the edge $n_3$-$n_7$, all of the edges in the subtree rooted at node $n_7$, the edge $n_8$-$n_{18}$, and all of the edges in the subtree rooted at $n_{18}$. The node-pair set is generated iteratively by repeating the following sequence of steps:

1. Find two leaves $n_k, n_l \in T$ such that their least common ancestor $n_{kl}$ does not contain another leaf of T in its subtree.
2. Let $n_i$ be the child of $n_{kl}$ that is an ancestor of $n_k$, and let $n_j$ be the child of $n_{kl}$ that is an ancestor of $n_l$. Add $(n_i, n_k)$ to the node-pair set if $n_i \neq n_k$, and add $(n_j, n_l)$ to the node-pair set if $n_j \neq n_l$.
3. Remove all descendants of $n_{kl}$ from T so that it becomes a leaf.

In the special case where only one leaf $n_k$ remains, and where $n_k \neq n_0$ (the root node), the node pair $(n_0, n_k)$ and the descendants of $n_0$ are removed from T. After each iteration, all privileged leaves that are descendants of a leaf in T are covered by some node pair. Also, the process above terminates after at most r iterations, since each iteration (except in the special case) reduces the number of leaves in T by one. This process will generate a node-pair set consisting of at most 2r-1 node pairs.

Once the node-pair set has been generated, the broadcast source decomposes each node pair into a node-pair key-set, preferably of minimal size. For example, node pair $(n_i, n_j)$ can be decomposed into $\lfloor (l(n_j)-l(n_i))/b \rfloor$ keys by letting $N_1$ be $n_j$'s ancestor at level $\lceil (l(n_i)+1)/b \rceil b$ and letting $N_{y+1}$ be $n_j$'s ancestor at level $l(N_y)+b$ for all y until $l(n_j)-l(N_z) \leq b$.

In one embodiment of the present application, once the broadcast source has generated $K_p$, it encrypts the broadcast session key bk under each key in $K_p$ to generate a set of ciphertexts $C_p$. The broadcast source transmits $C_p$, together with information sufficient for members of P to determine which ciphertext to decrypt. If $|R|$ is much less than $|P|$, where R is the set of revoked users, the information sent is R. Alternatively, the broadcast could send P, or the node-pair set.

To decrypt, a privileged user must determine which ciphertext it should decrypt. In one embodiment, the user does this by determining the node-pair set, using the same technique as the broadcast source. The privileged user then finds a node pair $(n_i, n_j)$ such that $n_i$ is an ancestor of $n_u$, the user's leaf, but $n_j$ is not an ancestor of $n_u$. The privileged user then determines which key in the decomposition of $(n_i, n_j)$ by determining which key $k_{n_k,n_l}$ in the decomposition, as computed above, has $n_k$ as an ancestor of n, while $n_l$ is not an ancestor of $n_u$. The privileged user uses $k_{n_k,n_l}$ to decrypt the appropriate ciphertext in $C_p$ to recover the broadcast session key bk and then the broadcast.

In the embodiment above, the number of secondary keys per user is at most $$(2a-b-2)\frac{\log n}{b} \approx (2a-\log a-2)\log_a n.$$

The number of transmissions is $t=K_p$. Let $N_p$ be the number of node pairs computed in the procedure above. Then, since each node pair decomposes into an average of at most $\log(n/N_p)/b$ node-pair keys, t is at most $N_p \log_a(n/N_p)$, which assumes its maximum at $N_p=2r-1$, the maximum number of node-pairs. Thus, t is at most $(2r-1) \log_a(n/(2r-1))$. One can also prove that t is at most $r(\log_a(n/r)+x)$ using more sophisticated techniques when $2ra^{2-x} \leq n$, wherein x is a variable. For example t is at most $r(\log_a(n/r)+1)$, when $2ra \leq n$.

In the second part of the invention, given an allocation of secondary keys to users, primary keys are constructed in accordance with the desired tradeoff between key storage cost k and key derivation cost c. The exact nature of this tradeoff depends on how key derivability (from primary keys to secondary keys) is handled mathematically. In one embodiment of this invention, key derivability is handled using techniques related to the RSA encryption scheme.

Key derivability can be modeled by a graph. In general, each secondary key $k_i$ can be associated with a subset of users $U_i = \{u: k_i \in K'_u\} \subseteq U$ that can derive $k_i$. These subsets form a poset under the inclusion relation, e.g., $U_i < U_j$ when $U_i \subset U_j$. This poset can be modelled as a DAG by associating each user subset $U_i$ with a vertex $v_i$ in a DAG, and including a directed edge from $v_i$ to $v_j$ in the DAG when $U_i < U_j$. If $U_i < U_j$, then key $k_j$ can be derived from key $k_i$, since every user in $U_i$ is also in $U_j$. Therefore, the directed edges of the DAG model key derivability: $k_i \rightarrow k_j$ (i.e., key $k_j$ may be derived from key $k_i$) only if $v_i \rightarrow v_j$ (i.e., there is a directed edge from vertex $v_i$ to vertex $v_j$). In certain circumstances, it may be advantageous to have $k_i \rightarrow k_j$ even when there is not a directed edge from vertex $v_i$ to vertex $v_j$ for some (i, j), but transitivity is required: if $k_i \rightarrow k_j$ and $k_j \rightarrow k_l$, then $k_i \rightarrow k_l$.

Figure 2:
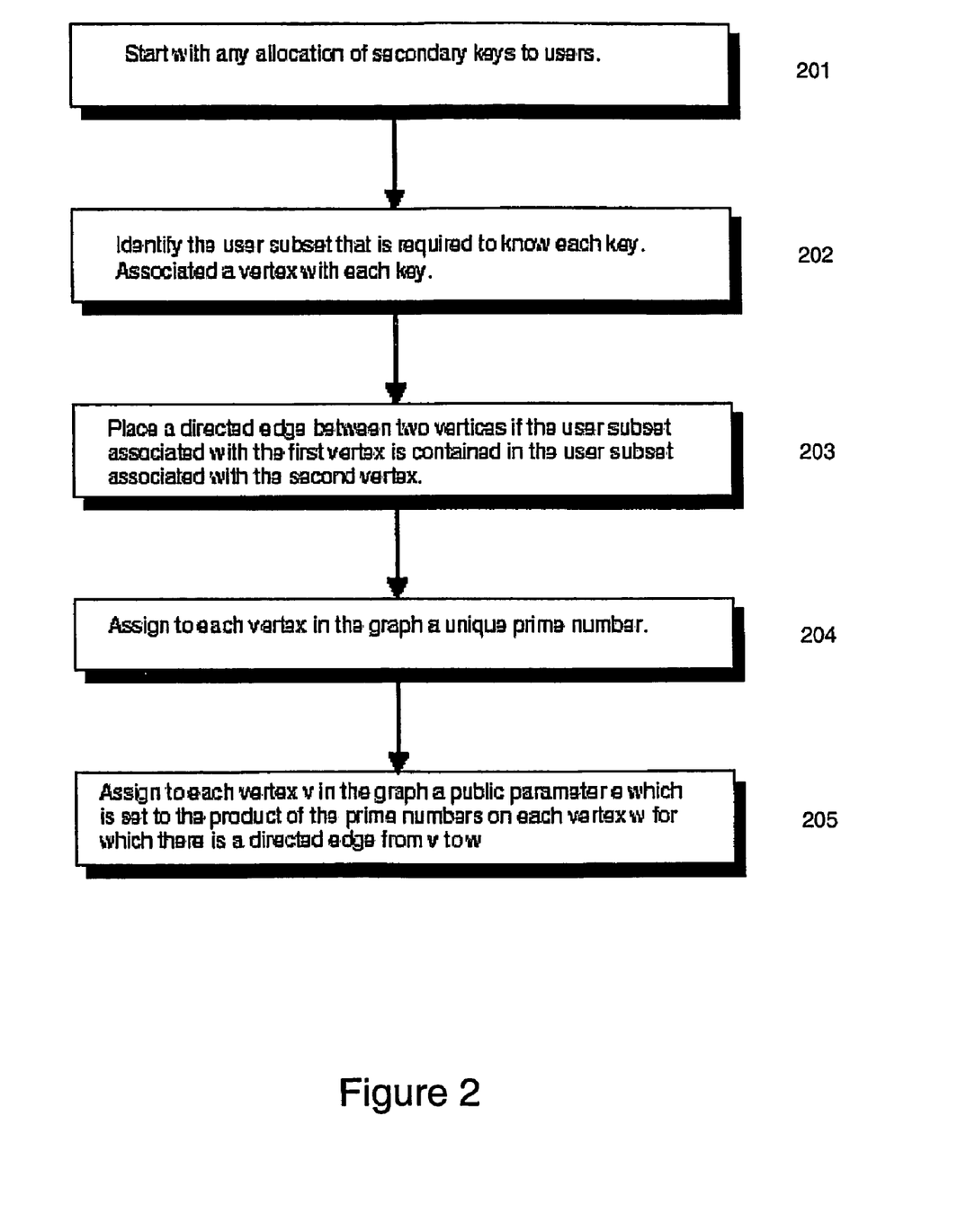
FIG. 2 shows a flow chart illustrating the method of modeling key derivability as a DAG according to one embodiment of the present invention.

FIG. 2 shows a flow chart illustrating the method of modelling key derivability as a directed acyclic graph. The process starts with any allocation of secondary keys to users at step 201. At step 202, the process identifies a user subset for each one of the secondary keys, so that the secondary key can be derived by users in its corresponding user subset. The process then associates a vertex of a DAG with each of the secondary keys, or its corresponding user subset. At step 203, a directed edge is placed between two vertices if the user subset associated with the first vertex v is contained in the user subset associated with the second vertex w. At step 204, a unique prime number is assigned to each vertex in the graph. At step 205, the process assigns to each vertex v in the graph a public parameter e which is set to be the product of the prime numbers on each vertex w for which there is a directed edge from v to w. Only the first three steps of the flow chart are needed for the general method. However, the last two steps are added to illustrate how to assign keys to the graph for an RSA-based embodiment of the present invention.

Given a transitive DAG G=(V, E), it is possible to construct a set of keys K, using techniques related to RSA, such that G models derivability among the keys. The broadcast source generates an RSA-type modulus N such that it is hard, for anyone other than the broadcast source, to factor N into nontrivial factors. Preferably, N is computed as the product of two safe primes, i.e., N=pq where p and q are large (e.g., 512-bit) primes such that p=2p'+1 and q=2q'+1 for prime p' and q', but N can be generated differently as long as it is hard to factor. The center fixes some m∈(Z/NZ)*. Keys have the form $k_i = m^{1/e_i}$ (mod N) for publicly known $e_i$.

Figure 3:
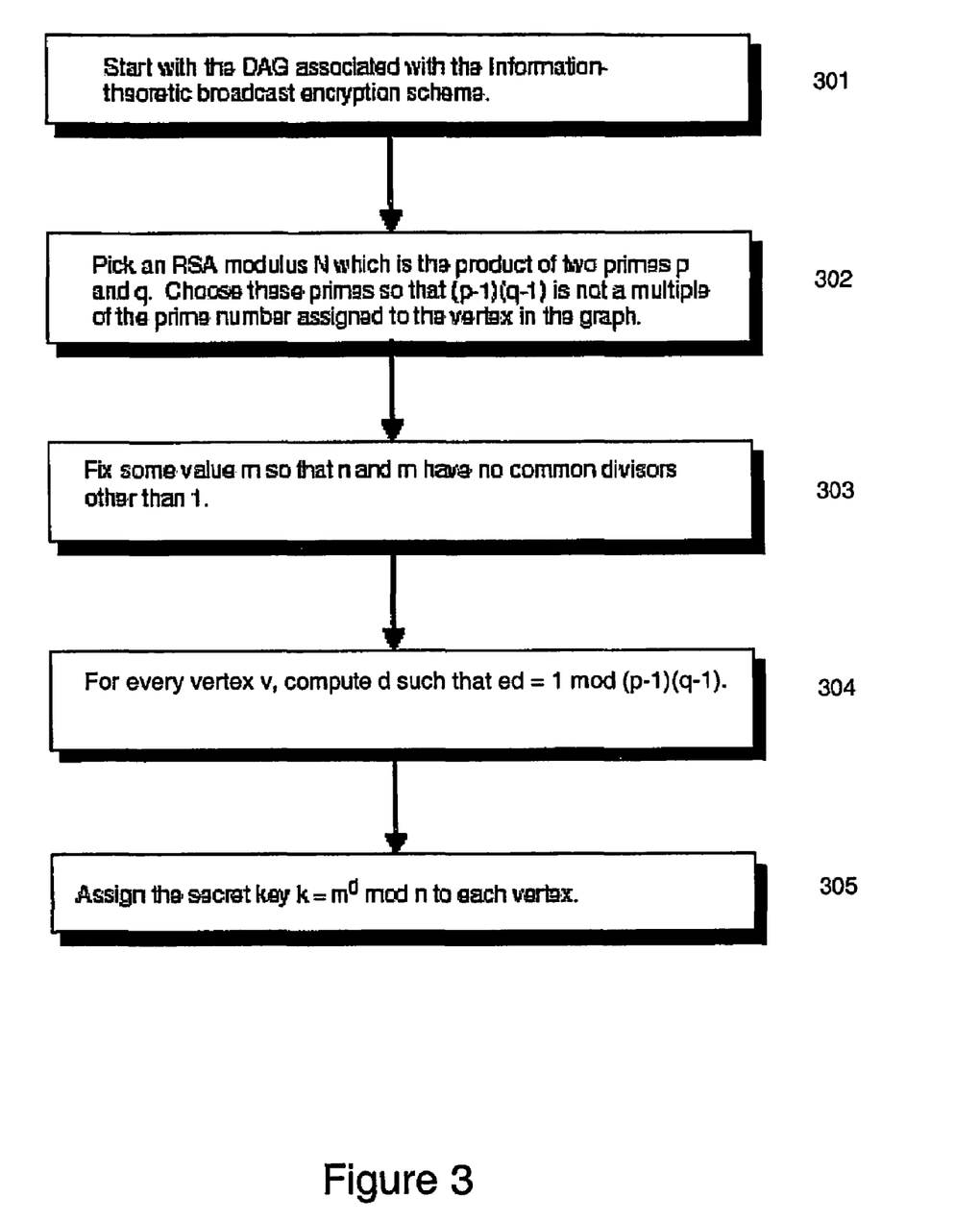
FIG. 3 shows a flow chart illustrating the method of assigning keys to the vertices of the DAG using an RSA-based technique according to one embodiment of the present invention.

FIG. 3 shows a flow chart illustrating the method of assigning keys to the vertices of the DAG using an RSA-based technique. The process starts with the DAG associated with the information-theoretic broadcast encryption scheme at step 301. At step 302, an RSA modulus N is picked. In one embodiment, RSA modulus N is the product of two primes p and q, wherein (p−1)(q−1) is not a multiple of the prime numbers assigned to the vertices in the graph. At step 303, values of m are fixed so that N and m have no common divisors other than 1. At step 304, d is computed for each vertex v, such that ed=1 mod (p−1)(q−1). At step 305, the secret key $k=m^d$ mod N is assigned to each vertex. Any user can derive $k_j$ from $k_i$ if $e_j$ divides $e_i$. More generally, $$\{k_{i_1}, \ldots, k_{i_z}\} \rightarrow k_j \text{ if and only if } e_j \text{ divides } \text{LCM}(e_{i_1}, \ldots, e_{i_z}). \quad (5)$$

Thus, key derivability is completely dictated by the factorization of the $e_i$'s. In one embodiment of the present invention, the method of structuring $e_i$'s depends on the desired key storage cost, i.e., how many primary keys a user stores. At one extreme, if it is desired that a user only stores one primary key, the method of choosing the $e_i$'s is to associate each vertex $v_i$ in the DAG with a distinct prime $p_i$, and set $e_i = \Pi_{v_i \rightarrow v_j} P_j$. Then, $k_i \rightarrow k_j$ precisely when $v_i \rightarrow v_j$. A2

Figure 4:
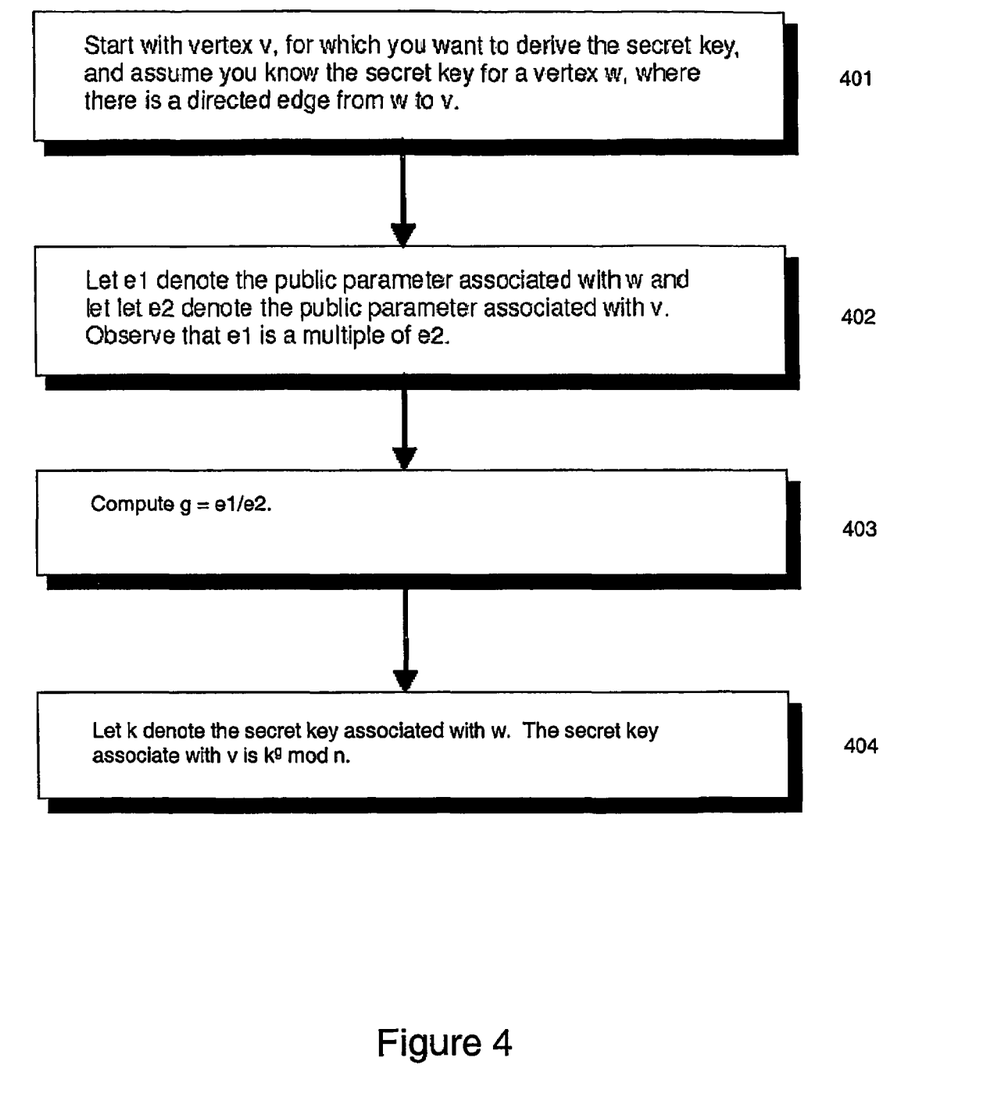
FIG. 4 shows a flow chart illustrating the method of deriving a key for a given vertex from the vertices that are adjacent to it according to one embodiment of the present invention.

FIG. 4 shows a flow chart illustrating the method of deriving a key for a given vertex from the vertices that are adjacent to it. According to one embodiment, these keys have the property of immiscibility, i.e., $\{k_{i_1}, \ldots, k_{i_z}\} \rightarrow k_j$ if and only if $k_{i_y} \rightarrow k_j$ for some $1 \leq y \leq z$. Thus, keys cannot be combined to gain new information. The user u's primary key is set to be $m^{1/E_u}$ (mod n), wherein $E_u = \text{LCM}(\{e_i: u \in U_i\})$. The method shown in FIG. 4 is used to derive the secret key of vertex v, assuming that there is a directed edge from a vertex w to the vertex v, and the secret key for the vertex w is known. The process starts at step 401. At step 402, e1 is used to denote the public parameter associated with w and e2 is used to denote the public parameter associated with v, wherein e1 is a multiple of e2. At step 403, a value g=e1/e2 is computed. At step 404, k is used to denote the secret key associated with w. The secret key associated with v is $k^g$ mod N.

Computing secondary keys from primary keys has a computational cost. Let $|k_i|$ denote $k_j \in K_u : k_i \rightarrow k_j$ (the number of keys in $K_u$ derivable from $K_i$). If $|k_i|$ is large, then $e_i$ is also large. In particular, $e_i$ has $|k_{i|+1}|$ prime factors. In the worst case, for a fixed number of secondary keys, the derivation cost $c_u$, and the key storage cost $|K_u|$ have an inverse relationship. Since secure storage is typically more expensive than computation, a particularly favorable tradeoff may be for each user to store a single primary key, i.e., $|K_{u|=1}|$. In this case, $c_u = |K_u|$ (actually, it is possible for $c_u = |K_u|-1$ if the primary key is not also a secondary key), regardless of how the $e_i$'s are structured. The above method for structuring the $e_i$'s when $|K_u|$ may substantially reduce average-case key derivation cost for some DAGs.

However, a higher key storage cost may be acceptable. Indeed, the tradeoff between key storage cost and key derivation cost is configurable: for a fixed set of secondary keys, reducing the number of primary keys stored results in an increase in the cost of deriving secondary keys from primary keys.

For $|K_u|>1$, in one embodiment of the method for structuring the $e_i$'s is to associate each vertex $v_i$ in the DAG with a distinct prime $p_i$, and set $e_i = p_i$. Let $K'_u = \{m^{1/e_{i_1}}, \ldots, m^{1/e_{i_l}}\}$ be the set of secondary keys that user u can derive, and suppose that the desired number of primary keys is d≦1, wherein l is the number of secondary keys a user u has, i.e., $|K'_u|$. Appropriate primary keys can be constructed by partitioning the secondary keys into d groups, each having at most d'=⌈l/d⌉ keys. Suppose, for example, that one such group consists of the keys $\{m^{1/e_{i}}, \ldots, m^{1/e_{i+j}}\}$. All of the secondary keys in this group can be derived from the primary key $m^{1/E_{i,j}}$, where $E_{i,j} = \text{LCM}(e_i, \ldots, e_{i+j}) = p_i p_{i+1} \ldots p_{i+j}$. Since there are a total of d groups, there are a total of d such primary keys. The value of d can be "fine-tuned" to be any positive integer. Since each group consists of at most d' keys, the worst-case key derivation c is at most d'−1 exponentiations.

In general, any structuring of the $e_i$'s that conforms to the DAG is permissible. A set of $e_i$'s conforms to the DAG if the corresponding $k_i$'s do, in light of the Equation (6) above and the requirement that the keys must be immiscible.

Combining the first and second parts of the present invention gives a broadcast encryption scheme with a configurable tradeoff among the number of transmissions t, the key storage cost k, and the key derivation cost c, that is nearly optimal for the class of RSA-related broadcast encryption schemes considered here. Specifically, the first part involves finding a construction that gives a tradeoff between t and the maximum number of secondary keys $\max_u |K'_u|$ that is nearly optimal in light of the Luby-Staddon bound. The second part results in, for a given desired key derivation cost $\max_u c_u$, a minimal number of primary keys $\max_u |K'_u|$ from which the secondary keys can be derived. Since $\max_u |K'_u| \leq \max_u |K_u| c_u|$, the two parts relate all three variables t, k, and c, and find a nearly optimal tradeoff among them.

The two parts are each useful independently. For example, the construction for the first part can also be used for unconditionally secure broadcast encryption. Also, the method of the second part applies generally to any allocation of secondary keys to users that is appropriate for broadcast encryption.

One advantage of the present invention over the conventional stateless receiver broadcast encryption schemes is practical configurability. In particular, the present invention allows each user to store only a single primary key, if desired. Previous schemes other than Asano's require each user to store at least r or log n keys, depending on the particular scheme. Asano allows each user to minimize its key storage cost, but does not provide a configurable tradeoff between key storage cost k and key derivation cost c, and the overall tradeoff among t, k and c is unfavorable. Specifically, letting a denote the branching factor in the key derivability graph in Asano's scheme, assuming each user stores a single key, and letting the maximum number of transmissions be $t=r(\log_a(n/r)+1)$, the user's computational requirement according to Asano becomes $c=(2^{a-1}-1)\log_a n$, which quickly becomes huge when a≧3. For equivalent transmission bandwidth and key storage cost, the present invention requires at most (2a−log a−2) $\log_a n$ computational units for key derivation. In addition, the product of the number of transmission with the number of primary keys for each user in the present invention is at most $r(\log_3(n/r)+1)$.

M. Abdalla, Y. Shavitt, and A. Wool, *Key Management for Restricted Multicast Using Broadcast Encryption* in ACM Trans. on Networking, vol. 8, No. 4, pages 443-454, 2000, incorporated herein by reference, describe how, in the information-theoretic context, pre-broadcast transmission bandwidth and/or key storage cost can be reduced if the broadcast source is willing to tolerate some members of revoked users R receiving the broadcast (in addition to all members in P). Specifically, a key allocation is defined as f-redundant if, for all privileged sets P, |r(P)|/|P|≦f, where r(P) is the set of users that can decrypt the broadcast intended for P, and obtain a less restrictive lower bound:

$$\max_u (|K'_u|) \geq \max_{1 \leq k \leq n/f} \left( \frac{1}{t} \left[ \binom{n}{k} \middle/ \binom{kf}{k} \right]^{1/t} - 1 \right) \middle/ (n-k),$$

where k is the maximum amount of keying material a user must persistently store, and f is the ratio of the total number of users that can decrypt the ciphertexts over the total number of users that are entitled to decrypt and f is always at least 1.

The ratio f is decided by the broadcast source. If f is set to be large, then a lot of non-privileged users will be able to decrypt the broadcast.

Abdalla et al. also provide constructions, and an algorithm for finding a good key cover. By extending this approach to the Akl-Taylor based constructions described above, similar tradeoffs are obtained as follows:

$$\max_u (|K_u||c_u|) \geq \max_{1 \leq k \leq n/f} \left( \frac{1}{t} \left[ \binom{n}{k} \middle/ \binom{kf}{k} \right]^{1/t} - 1 \right) \middle/ (n-k),$$

where $|K_u|$ is a user u's key storage requirement, $c_u$ is u's worst-case key derivation cost.

The notion of key derivability of the present invention is added to the Abdalla-Shavitt-Wool scheme. In other words, instead of using a relatively large number of secondary keys, a system according to one embodiment of the present invention could use a few primary keys $|K_u|$, which is a proper subset of $|K'_u|$, if the system is willing to accept a key derivability cost.

Figure 5:
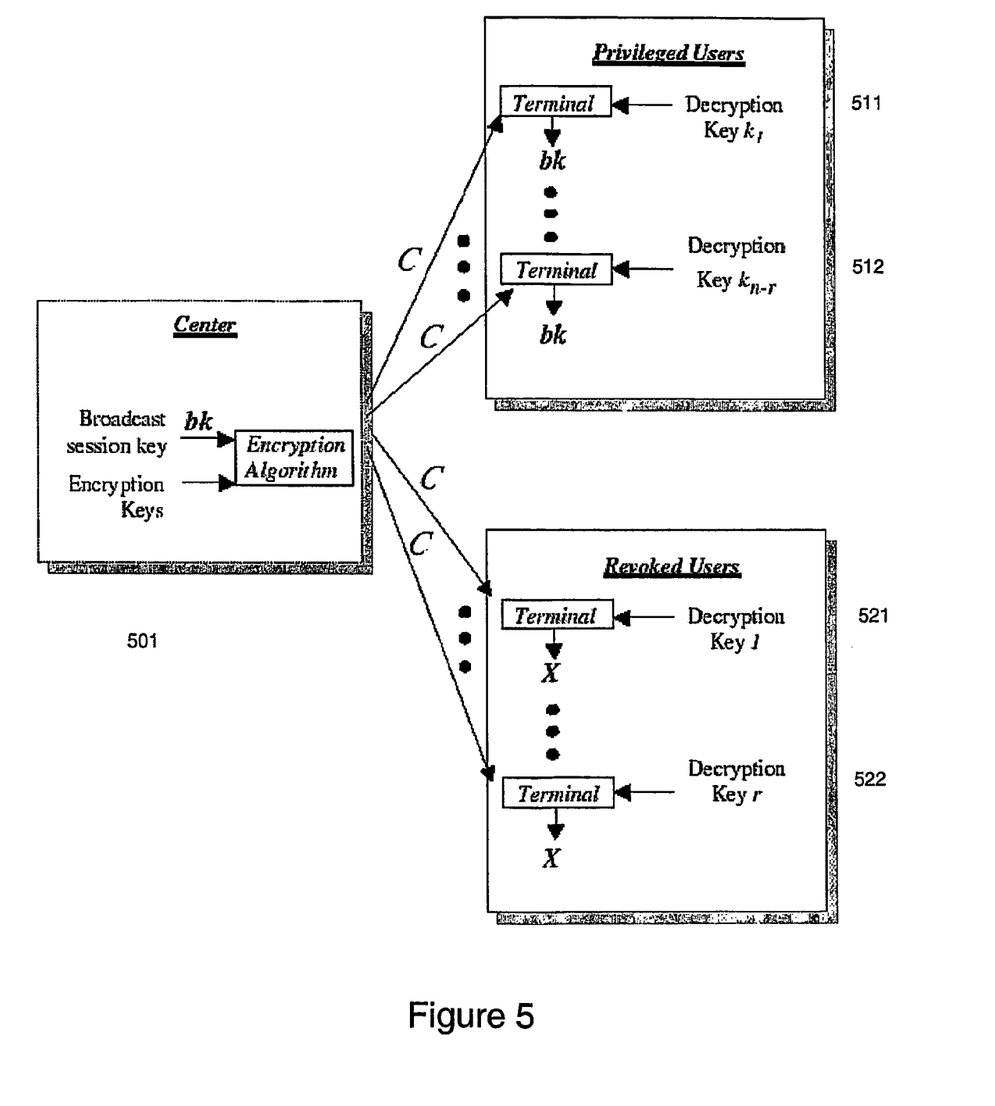
FIG. 5 briefly illustrates the signal flow of a system for broadcast encryption according to one embodiment of the present invention.

FIG. 5 briefly illustrates the signal flow of a system for broadcast encryption according to one embodiment of the present invention. A center 501 chooses a broadcast session key bk, encrypts bk under each of the encryption keys to generate a set of ciphertexts. The broadcast session key can only be correctly decrypted by the privileged users. Revoked users can not obtain any information about bk. The center 501 then transmits the ciphertexts, and information allowing privileged users to determine which ciphertext it can decrypt.

Privileged users 511 and 512 decrypt appropriate ciphertexts with the stored decryption keys to recover the broadcast session key bk and then the broadcast. Revoked users 521 and 522 can not decrypt the ciphertext and the broadcast.

Figure 6:
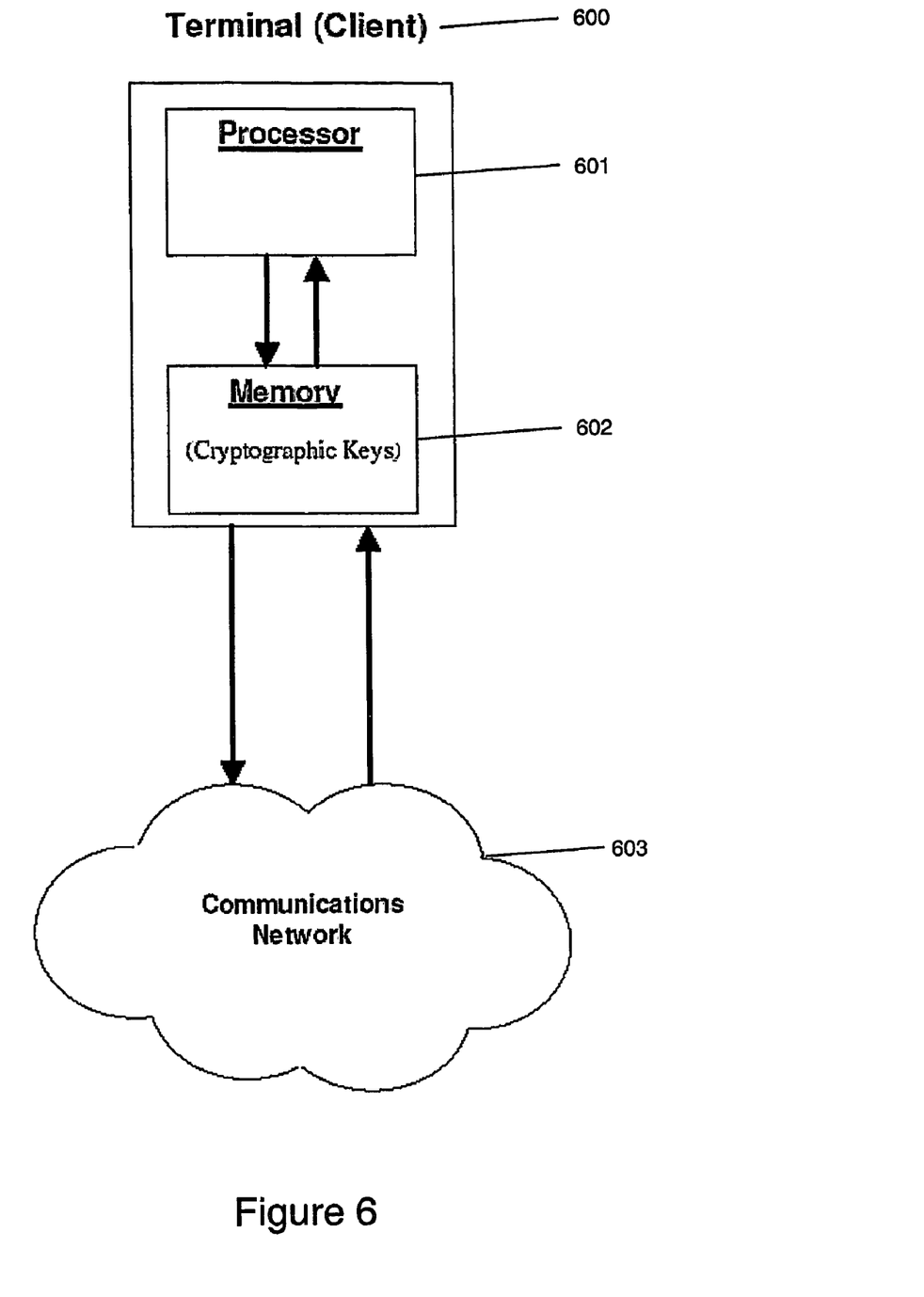
FIG. 6 shows a block diagram of a terminal or client which receives encrypted data from a server or center over a communication network according to one embodiment of the present invention.

FIG. 6 shows a block diagram of a terminal or client which receives encrypted data from the server or center over a communication network according to one embodiment of the present invention. The broadcast system of the present invention includes a number of terminals, each of which may be associated with an entity that generates or receives an encrypted broadcast according to the broadcast encryption schemes described above.

Each terminal 600 includes a processor 601 in bidirectional communication with a memory 602. The processor 601 executes program code for carrying out the procedures described above to generate, transmit, receive, or decrypt a broadcast. The processor 601 also executes program code for generating information to be transmitted to other terminals. Program code may be created according to methods known in the art. The memory 602 stores the program code, as well as intermediate results and other information used during execution of the broadcast encryption procedures.

A communications network 603 is provided over which the entities may communicate. The communications network may be of various common forms, including, for example, a LAN computer network, a WAN computer network, and/or a mobile telephone network.

Figure 7:
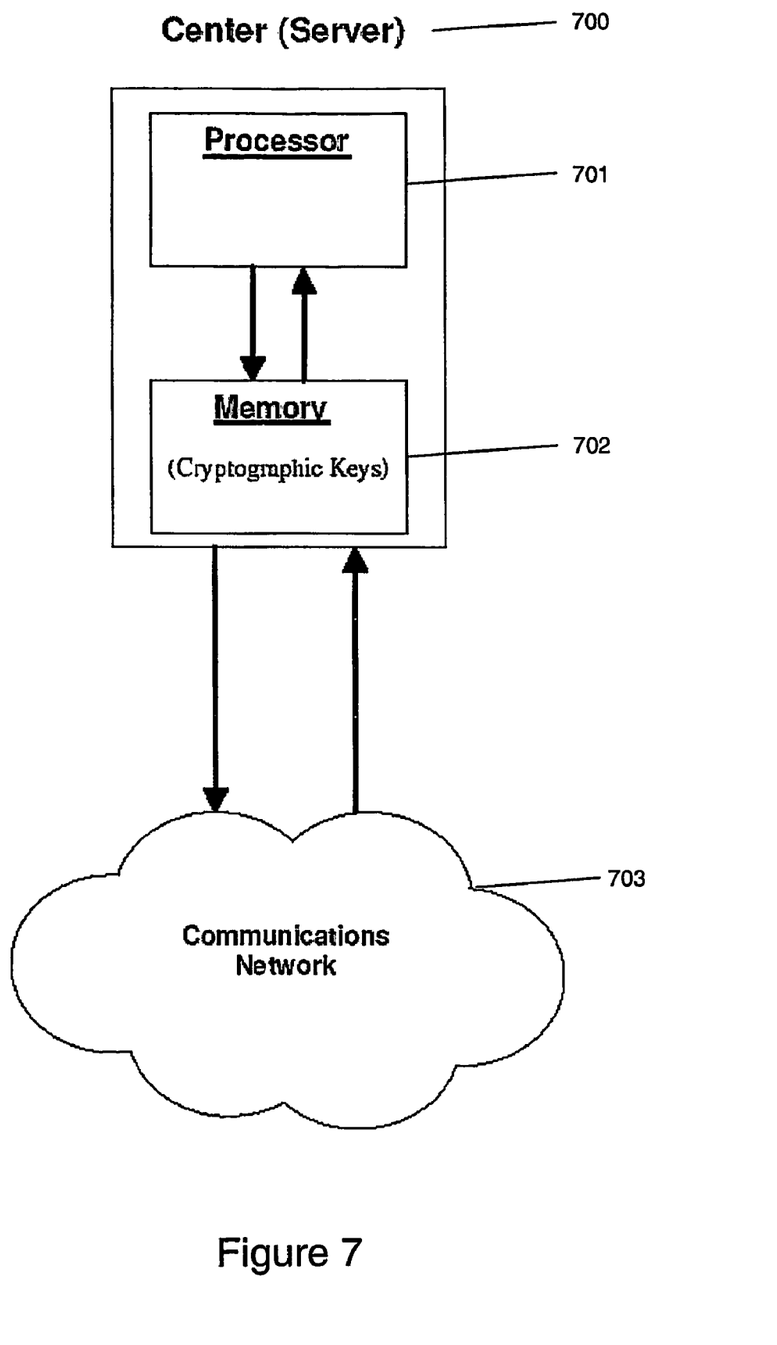
FIG. 7 shows a block diagram of a center or server which distributes data to terminals or clients over a communication network according to one embodiment of the present invention.

FIG. 7 shows a block diagram of a center or server which distributes data to terminals or clients over a communication network according to one embodiment of the present invention. Each center 700 includes a processor 701 in bidirectional communication with a memory 702. The processor 701 executes program code for carrying out the procedures described above to generate, encrypt, transmit or receive a broadcast. The memory 602 stores the program code, as well as intermediate results and other information used during execution of the broadcast encryption procedures. A communications network 703 is provided over which the entities may communicate.

Figure 8:
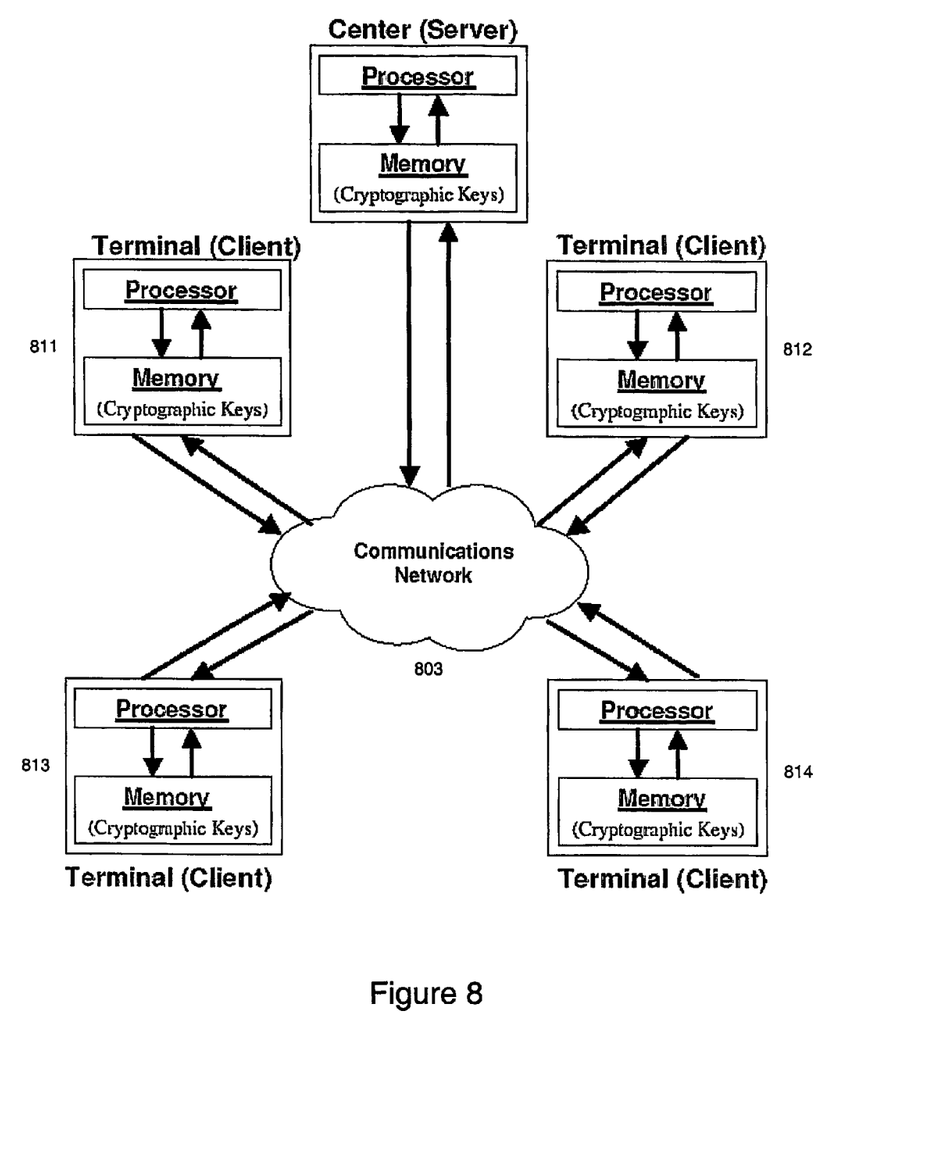
FIG. 8 shows a block diagram of a system for broadcast encryption according to one embodiment of the present invention.

FIG. 8 shows a block diagram of a system for broadcast encryption according to one embodiment of the present invention, including a center 801, a number of terminals 811, 812, 813 and 814, and a communication network 803. The center and terminals have been described above with reference to FIGS. 6 and 7.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

What is claimed is:

1. A method for encrypting a digital message between a broadcast source and a plurality of n users including r revoked users, such that a coalition of r<n/3 revoked users cannot decrypt the message, but each member of a selected subset of n−r privileged users can decrypt the message, the method comprising:

allocating at least one primary key to each user;

generating at least one secondary key;

generating ciphertexts by encrypting the digital message using the at least one secondary key; and communicating the generated ciphertexts to the privileged users, wherein the number of generated ciphertexts is at most $r(\log_a(n/r)+1)$ and the product of the key derivation cost and the number of primary keys for each user is at most $(2a-\log(a)-2)\log_a(n)$ when $a=2^b$, $1 \leq b \leq \log n$, and $a \geq 3$;

wherein the method further comprises forming a binary tree, with the broadcast source being associated with the root of the binary tree, and the plurality of n users being associated with the leaf nodes $n_u$ of the binary tree, wherein $n_i$ is an ancestor of $n_j$, and $n_i$ is on the path from $n_i$ to the root, and wherein the primary key $K_{n_i,n_j} \in K_u$ is generated for each of the leaf nodes $n_u$, such that $n_i$ is an ancestor of $n_u$, but $n_j$ is not an ancestor of $n_u$, wherein $K_u$ is the set of primary keys;

wherein the method further comprises generating a key $K_{n_i,n_j} \in K$ for a node pair $(n_i,n_j)$ such that $\lfloor l(n_i)/b \rfloor = \lfloor (l(n_i)-1)/b \rfloor$, wherein $l(n_i)$ and $l(n_j)$ are the depth of nodes $_i$, and $n_j$ from the root, $1 \leq b \leq \log_2 n$, and K is the set of all secondary keys;

wherein the method further comprises selecting a set of keys $K_p \epsilon K$, wherein P is a set of privileged users, so that each user in P knows at least one key in $K_p$, but no revoked user does;

wherein the method further comprises generating a node-pair set $\{(n_i, n_j): n_i \text{ is an ancestor of } n_j\}$, such that each privileged user u, but no revoked user, has a node-pair in the set, wherein $n_i$ is an ancestor of $n_u$, but $n_j$ is not an ancestor of $n_u$;

wherein the method further comprises decomposing each node pair into a node-pair key-set $k_{n_i,N_1}, k_{N_1,N_2}, \ldots, k_{N_z,n_j} \epsilon K$, wherein $n_i$ is an ancestor of N1, N1 is an ancestor of N2, and so on, such that $\lfloor l(n_i)/b \rfloor = \lfloor (l(N_1)-1)/b \rfloor$.

2. The method according to claim 1, wherein the product of the number of generated ciphertexts with the number of primary keys for each user is at most $r(\log_3(n/r)+1)$.

3. The method according to claim 1, wherein at least one user receives only one primary key.

4. The method according to claim 1, further comprising: allocating secondary keys to users for combinatorial tradeoff between the maximum number of generated ciphertexts and the maximum number of secondary keys that a user needs to know, without considering the cost for a user to derive secondary keys from the primary keys.

5. The method according to claim 1, further comprising: forming a Steiner tree $T=ST(R)$ by the root and revoked users $r \epsilon R$ wherein R is a set of the revoked users, and finding two leaves $n_k, n_l \epsilon T$ such that their least common ancestor $n_{kl}$ does not contain another leaf of T in its subtree;

letting $n_i$ be the child of $n_{kl}$ that is an ancestor of $n_k$, and letting $n_j$ be the child of $n_{kl}$ that is an ancestor of $n_l$, adding $(n_i, n_k)$ to the node-pair set if $n_i \neq n_k$, and adding $(n_j, n_l)$ to the node-pair set if $n_j \neq n_l$; and removing all descendants of $n_{kl}$ from T so that it becomes a leaf.

6. The method according to claim 1, further comprising: encrypting a broadcast session key bk under each key in $K_p$ to generate a set of ciphertexts $C_p$, and transmitting $C_p$ together with decryption enabling information sufficient for members of P to determine which ciphertext to decrypt.

7. The method according to claim 6, wherein the decryption enabling information is R.

8. The method according to claim 6, wherein the decryption enabling information is P.

9. The method according to claim 1, wherein the number of pre-broadcast transmissions is the number of keys in $K_p$.

10. The method according to claim 1, wherein the secondary key is generated by using an RSA-type modulus.

11. The method according to claim 1, wherein the tradeoff between the key derivation cost and the number of ciphertexts to be transmitted can be fine-tuned by adjusting the value of a.

12. A computer system comprising at least one processor, the computer system comprising program code which, when executed by the at least one processor, causes the computer system to perform the method of claim 1.

13. A method for encrypting a digital message between a broadcast source and a plurality of n users including r revoked users, such that a coalition of r revoked users cannot decrypt the message, but each member of a selected subset of n−r privileged users can decrypt the message, the method comprising:

allocating at least one primary key to each user:

generating at least one secondary key by using of an RSA-type modulus;

generating ciphertexts by encrypting the digital message using the at least one secondary key; and communicating the generated ciphertexts to the privileged users, wherein the number of generated ciphertexts is at most $r(\log_a(n/r)+1)$ and the product of the key derivation cost and the number of primary keys for each user is at most and $(2a-\log(a)-2)\log_a(n)$ when $a=2^b$, $1 \leq b \leq \log n$, and $a \geq 3$;

wherein the method further comprises forming a binary tree, with the broadcast source being associated with the root of the binary tree, and the plurality of n users being associated with the leaf nodes $n_u$ of the binary tree, wherein $n_i$ is an ancestor of $n_j$, and $n_i$ is on the path from $n_j$, to the root, and wherein the primary key $K_{n_i,n_j} \epsilon K_u$ is generated for each of the leaf nodes $n_u$, such that $n_i$ is an ancestor of $n_u$, but $n_j$, is not an ancestor of $n_u$, wherein $K_u$ is the set of primary keys;

wherein the method further comprises generating a key $K_{n_i,n_j} \epsilon K$ for a node pair $(n_i, n_j)$ such that $\lfloor l(n_i)/b \rfloor = \lfloor (l(n_i)-1)/b \rfloor$, wherein $l(n_i)$ and $l(n_j)$ are the depth of nodes $n_i$ and $n_j$ from the root, $1 \leq b \leq \log_2 n$, and K is the set of all secondary keys;

wherein the method further comprises selecting a set of keys $K_p \epsilon K$, wherein P is a set of privileged users, so that each user in P knows at least one key in $K_p$, but no revoked user does;

wherein the method further comprises generating a node-pair set $\{(n_i, n_j): n_i \text{ is an ancestor of } n_j\}$, such that each privileged user u, but no revoked user, has a node-pair in the set, wherein $n_i$ is an ancestor of $n_u$, but $n_j$ is not an ancestor of $n_u$;

wherein the method further comprises decomposing each node pair into a node-pair key-set $k_{n_i,N_1}, k_{N_1,N_2}, \ldots, k_{N_z,n_j} \epsilon K$, wherein $n_i$ is an ancestor of N1 is an ancestor of N2, and so on, such that $\lfloor l(n_j)/b \rfloor = \lfloor (l(N_1)-1)/b \rfloor$.

14. The method according to claim 13, wherein the product of the number of generated ciphertexts with the number of primary keys for each user is at most $r(\log_3(n/r)+1)$.

15. The method according to claim 13, wherein at least one user receives only one primary key.

16. The method according to claim 13, further comprising: allocating secondary keys to users for combinatorial tradeoff between the maximum number of generated ciphertexts and the maximum number of secondary keys that a user needs to know, without considering the cost for a user to derive secondary keys from the primary keys.

17. The method according to claim 13, further comprising: forming a Steiner tree $T=ST(R)$ by the root and revoked users $r \epsilon R$ wherein R is a set of the revoked users, and finding two leaves $n_k, n_l \epsilon T$ such that their least common ancestor $n_{kl}$ does not contain another leaf of T in its subtree;

letting $n_i$ be the child of $n_{kl}$ that is an ancestor of $n_k$, and letting $n_j$ be the child of $n_{kl}$ that is an ancestor of $n_l$, adding $(n_i, n_k)$ to the node-pair set if $n_i \neq n_k$, and adding $(n_j, n_l)$ to the node-pair set if $n_j \neq n_l$; and removing all descendants of $n_{kl}$ from T so that it becomes a leaf.

18. The method according to claim 13, further comprising: encrypting a broadcast session key bk under each key in $K_p$ to generate a set of ciphertexts $C_p$, and transmitting $C_p$ together with decryption enabling information sufficient for members of P to determine which ciphertext to decrypt.

19. The method according to claim 18, wherein the decryption enabling information is R.

20. The method according to claim 18, wherein the decryption enabling information is P.

21. The method according to claim 13, wherein the number of pre-broadcast transmission is the number of keys in $K_p$.

22. The method according to claim 13, wherein the tradeoff between the key derivation cost and the number of ciphertexts to be transmitted can be fine-tuned by adjusting the value of a.

23. The method of claim 13 further comprising:
receiving ciphertexts from the broadcast source;
deriving a secondary key from a primary key stored at a user by using the RSA-type modulus; and
decrypting a ciphertext using the derived secondary key.

24. The method according to claim 23, wherein at least one user stores only one primary key.

25. The method according to claim 23, wherein r<n/3.

26. The method according to claim 23, wherein the tradeoff between the key derivation cost and the number of primary keys for each user can be fine-tuned by adjusting the number of secondary keys a user u has.

27. The method of claim 13 further comprising:
receiving ciphertexts from the broadcast source;
deriving a secondary key from a primary key stored at a user; and
decrypting a ciphertext using the derived secondary key.

28. A computer system comprising at least one processor, the computer system comprising program code which, when executed by the at least one processor, causes the computer system to perform the method of claim 13.

29. A method for encrypting a message by a broadcast source for broadcast transmission to enable the message to be decrypted by each privileged user but not by one or more revoked users, the method comprising:

(1) the broadcast source obtaining a signal specifying a plurality of sets $\{n_i\}$, each set being a set of one or more of the users, the sets $\{n_i\}$ comprising, for each user u, a singleton set $n_u$ consisting of the user u, wherein the sets $\{n_i\}$ are representable as nodes of a tree in which the singleton sets are leaf nodes and every non-leaf node is a set of the users corresponding to the leaf descendants of the non-leaf node;

(2) from node pairs $(n_i,n_j)$ such that $n_j$ is a descendant of $n_i$ (i.e. such that the set $n_j$ is a subset of $n_i$), wherein each node pair $(n_i,n_j)$ is associated with a set difference $n_j/n_i$, the broadcast source obtaining one or more first node pairs whose associated set differences include each privileged user but do not include at least one revoked user;

wherein a node pair $(n_i,n_j)$ is defined as satisfying a first condition if:

$$\lfloor l(n_i)/b \rfloor = \lfloor (l(n_j)-1)/b \rfloor$$

wherein a function l associates each node with the node's level in the tree, and b is a predefined positive integer;

(3) the broadcast source determining one or more second node pairs corresponding to the one or more first node pairs, wherein each second node pair satisfies the first condition, and each first node pair $(n_i,n_j)$ either coincides with a second node pair or corresponds to a sequence of two or more second node pairs $(n_i, \ldots) \ldots (\ldots, n_j)$ such that:

the first node $n_i$ of the first node pair coincides with the first node of the starting second node pair in the sequence;

the second node $n_j$ of the first node pair coincides with the last node of the last second node pair in the sequence;

in each second node pair in the sequence except the starting node pair, the first node coincides with the last node of the immediately preceding second node pair in the sequence;

(4) for each of one or more second node pairs whose associated set differences together comprise each privileged user, the broadcast source encrypting the message for decryption with a cryptographic key associated with the second node pair.

30. The method of claim 29 wherein the first condition is not satisfied for at least one first node pair.

31. The method of claim 30 wherein the integer b is at least 2.

32. The method of claim 30 further comprising broadcasting the encrypted digital message to the users.

33. A broadcast source comprising a processor and memory, for performing the method of claim 30.

34. A computer system comprising at least one processor, the computer system comprising program code which, when executed by the at least one processor, causes the computer system to perform the method of claim 30.

35. A computer-readable storage medium medium containing program code for performing the method according to claim 30.

36. A computer system comprising at least one processor, the computer system comprising program code which, when executed by the at least one processor, causes the computer system to perform the method of claim 29.

37. A computer-readable storage medium claim 29.

38. A method for decrypting an encrypted message received by a first receiver in broadcast transmission to one or more privileged users and one or more revoked users, the first receiver being operating on behalf of a first user which is one of the one or more privileged users, the method comprising:

(1) the first receiver obtaining a signal specifying a plurality of sets $\{n_i\}$, each set being a set of one or more of the users, the sets $\{n_i\}$ comprising, for each user u, a singleton set $n_u$ consisting of the user u, wherein the sets $\{n_i\}$ are representable as nodes of a tree in which the singleton sets are leaf nodes and every non-leaf node is a set of the users corresponding to the leaf descendants of the non-leaf node;

(2) from node pairs $(n_i,n_j)$ such that $n_j$ is a descendant of $n_i$ (i.e. such that the set $n_j$ is a subset of $n_i$), wherein each node pair $(n_i,n_j)$ is associated with a set difference $n_j/n_i$, the first receiver obtaining a first node pair whose associated set difference includes the first user but does not include at least one revoked user;

wherein a node pair $(n_i,n_j)$ is defined as satisfying a first condition if:

$$\lfloor l(n_i)/b \rfloor = \lfloor (l(n_j)-1)/b \rfloor$$

wherein a function l associates each node with the node's level in the tree, and b is a predefined positive integer;

(3) the first receiver determining one or more second node pairs corresponding to the first node pair, wherein each second node pair satisfies the first condition, and the first node pair $(n_i,n_j)$ either coincides with a second node pair or corresponds to a sequence of two or more second node pairs $(n_i, \ldots) \ldots (\ldots, n_j)$ such that:

the first node $n_i$ of the first node pair coincides with the first node of the starting second node pair in the sequence;

the second node $n_j$ of the first node pair coincides with the last node of the last second node pair in the sequence;

in each second node pair in the sequence except the starting node pair, the first node coincides with the last node of the immediately preceding second node pair in the sequence;

(4) from the one or more second node pairs, the first receiver determining a second node pair whose associated set difference comprises the first user, and the first receiver decrypting the encrypted message with a cryptographic key associated with the second node pair.

39. The method of claim 38 wherein the first condition is not satisfied for the first node pair.

40. The method of claim 39 wherein the integer b is at least 2.

41. A first receiver comprising a processor and memory, for performing the method of claim 39.

42. A computer system comprising at least one processor, the computer system comprising program code which, when executed by the at least one processor, causes the computer system to perform the method of claim 39.

43. A computer-readable storage medium containing program code for performing the method according to claim 39.

44. A computer system comprising at least one processor, the computer system comprising program code which, when executed by the at least one processor, causes the computer system to perform the method of claim 38.

45. A computer-readable storage medium containing program code for performing the method according to claim 38.

46. A method for generating a plurality of cryptographic keys for encrypting and/or decrypting broadcast transmissions transmitted to a plurality of receivers, to enable each broadcast transmission to be decrypted by each privileged user but not by at least one revoked user, the method comprising:

(1) obtaining a signal specifying a plurality of sets $\{n_i\}$, each set being a set of one or more of the users, the sets $\{n_i\}$ comprising, for each user u, a singleton set $n_u$ consisting of the user u, wherein the sets $\{n_i\}$ are representable as nodes of a tree in which the singleton sets are leaf nodes and every non-leaf node is a set of the users corresponding to the leaf descendants of the non-leaf node;

(2) performing signal processing identifying node pairs $(n_i, n_j)$ satisfying the following conditions:

(2A) $n_j$ is a descendant of $n_i$ (i.e. such that the set $n_j$ is a subset of $n_i$), wherein each node pair $(n_i, n_j)$ is associated with a set difference $n_i/n_j$;

$$\lfloor l(n_i)/b \rfloor = \lfloor (l(n_j)-1)/b \rfloor \qquad (2B)$$

wherein a function l associates each node with the node's level in the tree, and b is a predefined positive integer;

wherein each said node pair $(n_i, n_j)$ is associated with a cryptographic key $k_{n_i, n_j}$; and (3) performing signal processing generating, for each user, one or more associated cryptographic keys from which each cryptographic key $k_{n_i, n_j}$ is derivable if, and only if, the user belongs to the set difference associated with the node pair $(n_i, n_j)$.

47. The method of claim 46 further comprising providing to each user the one or more associated cryptographic keys.

48. The method of claim 46 wherein the integer b is at least 2.

49. An apparatus comprising a processor and memory, for performing the method of claim 46.

50. A computer system comprising at least one processor, the computer system comprising program code which, when executed by the at least one processor, causes the computer system to perform the method of claim 46.

51. A computer-readable storage medium containing program code for performing the method according to claim 46.

\* \* \* \* \*